United States Patent
Zhou et al.

(10) Patent No.: US 12,207,146 B2
(45) Date of Patent: *Jan. 21, 2025

(54) USING DYNAMIC THRESHOLDS FOR NON-MOBILITY HANDOVERS IN A FIFTH GENERATION (5G) OR OTHER NEXT GENERATION NETWORK

(71) Applicant: AT&T Intellectual Property I, L.P., Atlanta, GA (US)

(72) Inventors: Yu Zhou, Somerset, NJ (US); Rittwik Jana, Montville, NJ (US); Xuan Tuyen Tran, Piscataway, NJ (US); Nalin Ahuja, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/192,620

(22) Filed: Mar. 29, 2023

(65) Prior Publication Data

US 2023/0247497 A1    Aug. 3, 2023

Related U.S. Application Data

(63) Continuation of application No. 17/103,287, filed on Nov. 24, 2020, now Pat. No. 11,638,186.

(51) Int. Cl.
*H04W 36/00* (2009.01)
*H04W 36/22* (2009.01)
*H04W 36/36* (2009.01)

(52) U.S. Cl.
CPC . *H04W 36/00837* (2018.08); *H04W 36/0058* (2018.08); *H04W 36/22* (2013.01); *H04W 36/36* (2013.01)

(58) Field of Classification Search
CPC ....... H04W 36/00837; H04W 36/0058; H04W 36/0072; H04W 36/22; H04W 36/36; Y02D 30/70
See application file for complete search history.

(56) References Cited

U.S. PATENT DOCUMENTS 9,432,901 B1 *  8/2016  Kwan ................. H04W 36/30
11,012,911 B2 *  5/2021  Kim .................... H04W 36/38
(Continued)

*Primary Examiner* — Kan Yuen
(74) *Attorney, Agent, or Firm* — GUNTIN & GUST, PLC; Ralph Trementozzi

(57) ABSTRACT

The technologies described herein are generally directed to modeling radio wave propagation in a fifth generation (5G) network or other next generation networks. For example, a method described herein can include, for a network application, identifying, by a system comprising a processor, a first performance characteristic of first base station equipment, wherein the first base station equipment is actively communicating with a user equipment via a first network connection. The method can further include, based on the first performance characteristic being in a condition in relation to a first threshold, determining, by the system, to execute a handover of the user equipment to a second network connection with second base station equipment, resulting in a handover determination. Further, the method can include, based on the handover determination, facilitating, by the system, executing the handover of the user equipment to the second network connection.

20 Claims, 10 Drawing Sheets

(56) References Cited

U.S. PATENT DOCUMENTS

| | | | | |
|---|---|---|---|---|
| 2010/0113019 A1* | 5/2010 | Jeong | ............... | H04W 36/322 455/435.2 |
| 2012/0082028 A1* | 4/2012 | Kojima | ............... | H04W 36/22 370/230 |
| 2012/0252464 A1* | 10/2012 | Borst | ............... | H04W 36/302 455/443 |
| 2015/0304929 A1* | 10/2015 | Hua | ............... | H04W 36/32 455/436 |
| 2015/0358883 A1* | 12/2015 | Axelsson | ............... | H04W 36/304 370/252 |
| 2016/0174125 A1* | 6/2016 | Kobayashi | ............... | H04W 36/302 370/332 |
| 2017/0201909 A1* | 7/2017 | Kobayashi | ............... | H04W 28/18 |
| 2020/0120557 A1* | 4/2020 | Zhang | ............... | H04W 36/0009 |
| 2020/0195539 A1* | 6/2020 | Sivaraj | ............... | G06N 20/20 |
| 2023/0164657 A1* | 5/2023 | Yang | ............... | H04W 36/08 455/436 |

\* cited by examiner

USING DYNAMIC THRESHOLDS FOR NON-MOBILITY HANDOVERS IN A FIFTH GENERATION (5G) OR OTHER NEXT GENERATION NETWORK

RELATED APPLICATION

The subject patent application is a continuation of, and claims priority to, U.S. patent application Ser. No. 17/103,287, filed Nov. 24, 2020, and entitled "USING DYNAMIC THRESHOLDS FOR NON-MOBILITY HANDOVERS IN A FIFTH GENERATION (5G) OR OTHER NEXT GENERATION NETWORK," the entirety of which priority application is hereby incorporated by reference herein.

TECHNICAL FIELD

The subject application is related to implementation of fifth generation (5G) wireless communication systems or other next generation wireless communication systems, and, for example, different approaches to managing non-mobility handovers of user equipment.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
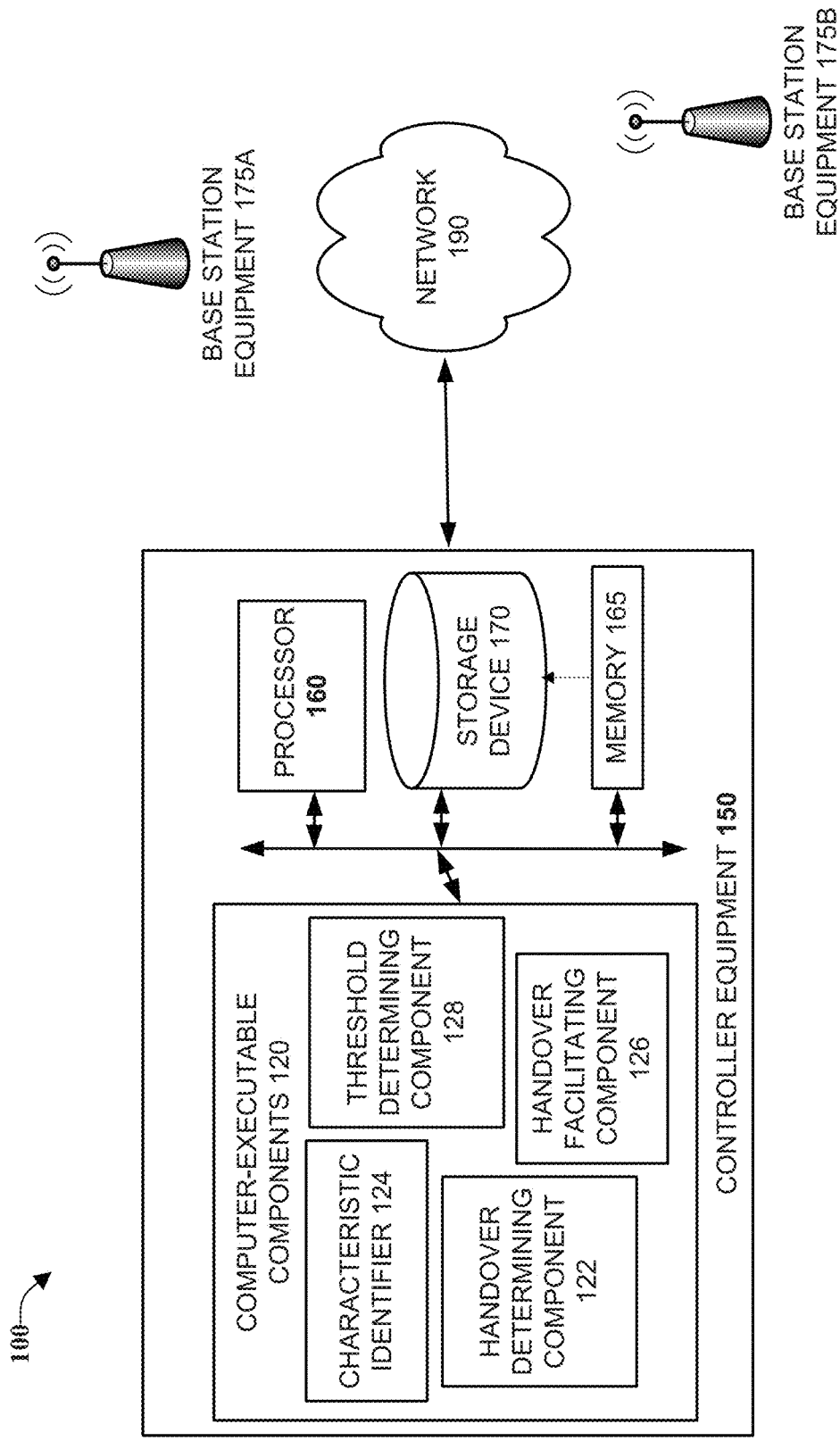
FIG. 1 is an architecture diagram of an example system that can facilitate reducing cell congestion with non-mobility handovers based on dynamic congestion thresholds, in accordance with one or more embodiments.

Generally speaking, one or more embodiments can facilitate reducing cell congestion with non-mobility handovers based on dynamic congestion thresholds. In addition, one or more embodiments described herein can be directed towards a multi-connectivity framework that supports the operation of new radio (NR, sometimes referred to as 5G). As will be understood, one or more embodiments can allow an integration of user devices with network assistance, by supporting control and mobility functionality on cellular links (e.g., long term evolution (LTE) or NR). One or more embodiments can provide benefits including, system robustness, reduced overhead, and global resource management, while facilitating direct communication links via a NR sidelink.

It should be understood that any of the examples and terms used herein are non-limiting. For instance, while examples are generally directed to non-standalone operation where the NR backhaul links are operating on millimeter wave (mmWave) bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

In some embodiments the non-limiting terms "radio-access network equipment," "signal propagation equipment" or simply "propagation equipment," "radio network node" or simply "network node," "radio network device," "network device," and access elements are used herein. These terms may be used interchangeably, and refer to any type of network node that can serve user equipment and/or be connected to other network node or network element or any radio node from where user equipment can receive a signal. Examples of radio network node include, but are not limited to, base stations (BS), multi-standard radio (MSR) nodes such as MSR BS, gNodeB, eNode B, network controllers, radio network controllers (RNC), base station controllers (BSC), relay, donor node controlling relay, base transceiver stations (BTS), access points (AP), transmission points, transmission nodes, remote radio units (RRU) (also termed radio units herein), remote ratio heads (RRH), and nodes in distributed antenna system (DAS). Additional types of nodes are also discussed with embodiments below, e.g., donor node equipment and relay node equipment, an example use of these being enabled via a network with an integrated access backhaul network topology.

In some embodiments, the non-limiting term user equipment (UE) is used. This term can refer to any type of wireless device that can communicate with a radio network node in a cellular or mobile communication system. Examples of UEs include, but are not limited to, a target device, device to device (D2D) user equipment, machine type user equipment, user equipment capable of machine to machine (M2M) communication, PDAs, tablets, mobile terminals, smart phones, laptop embedded equipped (LEE), laptop mounted equipment (LME), USB dongles, and other equipment that can have similar connectivity. Example UEs are described further with FIGS. 9 and 10 below. Some embodiments are described in particular for 5G new radio systems, but embodiments however can, in some circumstances, be applicable to any RAT or multi-RAT system, where the UEs operate using multiple carriers, e.g., LTE.

The computer processing systems, computer-implemented methods, apparatus and/or computer program products described herein employ hardware and/or software to solve problems that are highly technical in nature (e.g., rapidly adjusting thresholds for handover events in multiple base stations), that are not abstract and cannot be performed as a set of mental acts by a human. For example, a human, or even a plurality of humans, cannot efficiently analyze complex utilization rates (which generally cannot be performed manually by a human) with the same level of accuracy and/or efficiency as the various embodiments described herein.

Aspects of the subject disclosure will now be described more fully hereinafter with reference to the accompanying drawings in which example components, graphs and selected operations are shown. In the following description, for purposes of explanation, numerous specific details are set forth in order to provide a thorough understanding of the various embodiments. For example, some embodiments described can facilitate controlling network transmission parameters to reduce streaming latency. Different examples that describe these aspects are included with the description of FIGS. 1-10 below. It should be noted that the subject disclosure may be embodied in many different forms and should not be construed as limited to this example or other examples set forth herein.

Generally speaking, in LTE and NR networks, load balancing mechanisms can utilize handovers to reduce congestion and balance allocation of resources. Cell utilization (also termed cell coverage utilization herein) can, in one or more embodiments be a combination of data channel and control channel source utilization, and can be used to define the cell congestion.

FIG. 1 is an architecture diagram of an example system 100 that can facilitate reducing cell congestion with non-mobility handovers based on dynamic congestion thresholds, in accordance with one or more embodiments. For purposes of brevity, description of like elements and/or processes employed in other embodiments is omitted.

As depicted, system 100 can include controller equipment 150 communicatively coupled to network 190. In one or more embodiments, controller equipment can include computer executable components 120, processor 160, storage device 170, and memory 165. Computer executable components 120 can include characteristic identifier 124, handover determining component 122, handover facilitating component 126, threshold determining component 128, and other components described or suggested by different embodiments described herein that can improve the operation of system 100. It should be appreciated that these components, as well as aspects of the embodiments of the subject disclosure depicted in this figure and various figures disclosed herein, are for illustration only, and as such, the architecture of such embodiments are not limited to the systems, devices, and/or components depicted therein. For example, in some embodiments, controller equipment 150 can further comprise various computer and/or computing-based elements described herein with reference to operating environment 1000 and FIG. 10.

In some embodiments, memory 165 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1006 and FIG. 10. Such examples of memory 165 can be employed to implement any embodiments of the subject disclosure.

According to multiple embodiments, storage device 170 can include, but is not limited to, RAM, ROM, EEPROM, flash memory or other memory technology, solid state drive (SSD) or other solid-state storage technology, Compact Disk Read Only Memory (CD ROM), digital video disk (DVD), blu-ray disk, or other optical disk storage, magnetic cassettes, magnetic tape, magnetic disk storage or other magnetic storage devices, or any other medium which can be used to store the desired information and which can be accessed by the computer.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more components including, but not limited to, a central processing unit, a multi-core processor, a microprocessor, dual microprocessors, a microcontroller, a system on a chip (SOC), an array processor, a vector processor, and other types of processors. Further examples of processor 160 are described below with reference to processing unit 1004 of FIG. 10. Such examples of processor 160 can be employed to implement any embodiments of the subject disclosure.

In one or more embodiments, computer executable components 120 can be used in connection with implementing one or more of the systems, devices, components, and/or computer-implemented operations shown and described in connection with FIG. 1 or other figures disclosed herein. For example, in one or more embodiments, computer executable components 120 can include instructions that, when executed by processor 160, can facilitate performance of operations defining characteristic identifier 124. As discussed below, handover determining component 122 can, in accordance with one or more embodiments, identify a first performance characteristic of first base station equipment, with the first base station equipment actively communicating with a user equipment via a first network connection.

In another example, in one or more embodiments, computer executable components 120 can include instructions that, when executed by processor 160, can facilitate performance of operations defining handover determining component 128. As discussed herein, handover determining component 128 can, in one or more embodiments, based on the first performance characteristic being in a condition in relation to a first threshold, determine to execute a handover of the user equipment to a second network connection with second base station equipment, resulting in a handover determination.

In another example, in one or more embodiments, computer executable components 120 can include instructions that, when executed by processor 160, can facilitate performance of operations defining handover facilitating component 126. As discussed herein, handover facilitating component 126 can, in one or more embodiments, facilitate executing the handover of the user equipment to the second network connection.

Figure 2:
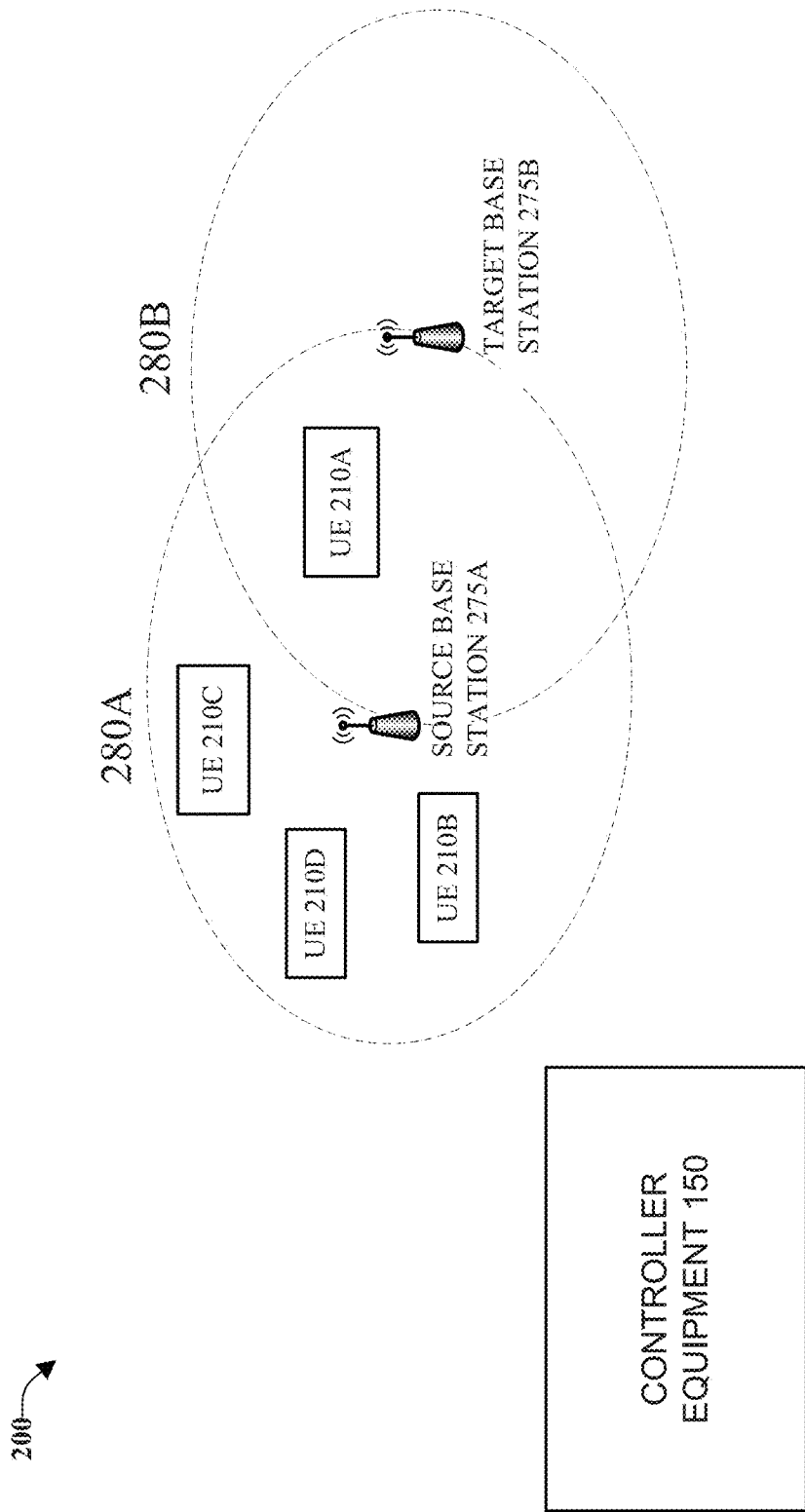
FIG. 2 is a diagram of a non-limiting example system that can facilitate reducing cell congestion with non-mobility handovers based on dynamic congestion thresholds, in accordance with one or more embodiments.

In one or more embodiments discussed herein, handovers between base stations 175A-B can occur for a variety of reasons, e.g., a mobility-based handover based on a UE moving from coverage area to coverage area. As disclosed with several examples described herein, handovers can also be unrelated to movement out of a coverage area of a base station, e.g., a non-mobility handover FIG. 2 is a diagram of a non-limiting example system 200 that can facilitate reducing cell congestion with non-mobility handovers based on dynamic congestion thresholds, in accordance with one or more embodiments. For purposes of brevity, description of like elements and/or processes employed in other embodiments is omitted. System 200 can include controller equipment 150, and UEs 210A-B being served by source base station 275A, and potentially being handed over to target base station 275B. As depicted, source base station 275A and target base station 275B have respective coverage areas 280A-B.

With respect to labels of "source" base station 275A and "target" base station 275B, it should be noted that, source and target labels are used herein for convenience, e.g., to identify the base station with the active connection to a user equipment, and a destination (e.g., a target) base station to which the user equipment can be handed over in certain circumstances, respectively.

It should be noted that, in some examples discussed herein, base station equipment 275A-B are described as having some features of an LTE cellular network, e.g., cell towers with macrocell coverage area spanning miles, in some circumstances. One having skill in the relevant art(s), given the description herein however, would appreciate that these examples are non-limiting, with other types of wireless access points can also benefit from one or more embodiments described herein. For example, in a fifth generation or other next generation network, the smaller cell coverage areas and arrays of high-attenuation mmWave antennas can also have issues that can be addressed by one or more embodiments described herein, e.g., cell coverage congestion and handover target base station selection. Particularly for these networks, the features of one or more embodiments described below that can facilitate switching between antennas of the same base station as well as between base stations, can be beneficially utilized. Additional elements of FIG. 2 are used to illustrate the examples discussed with FIG. 3 below.

Figure 3:
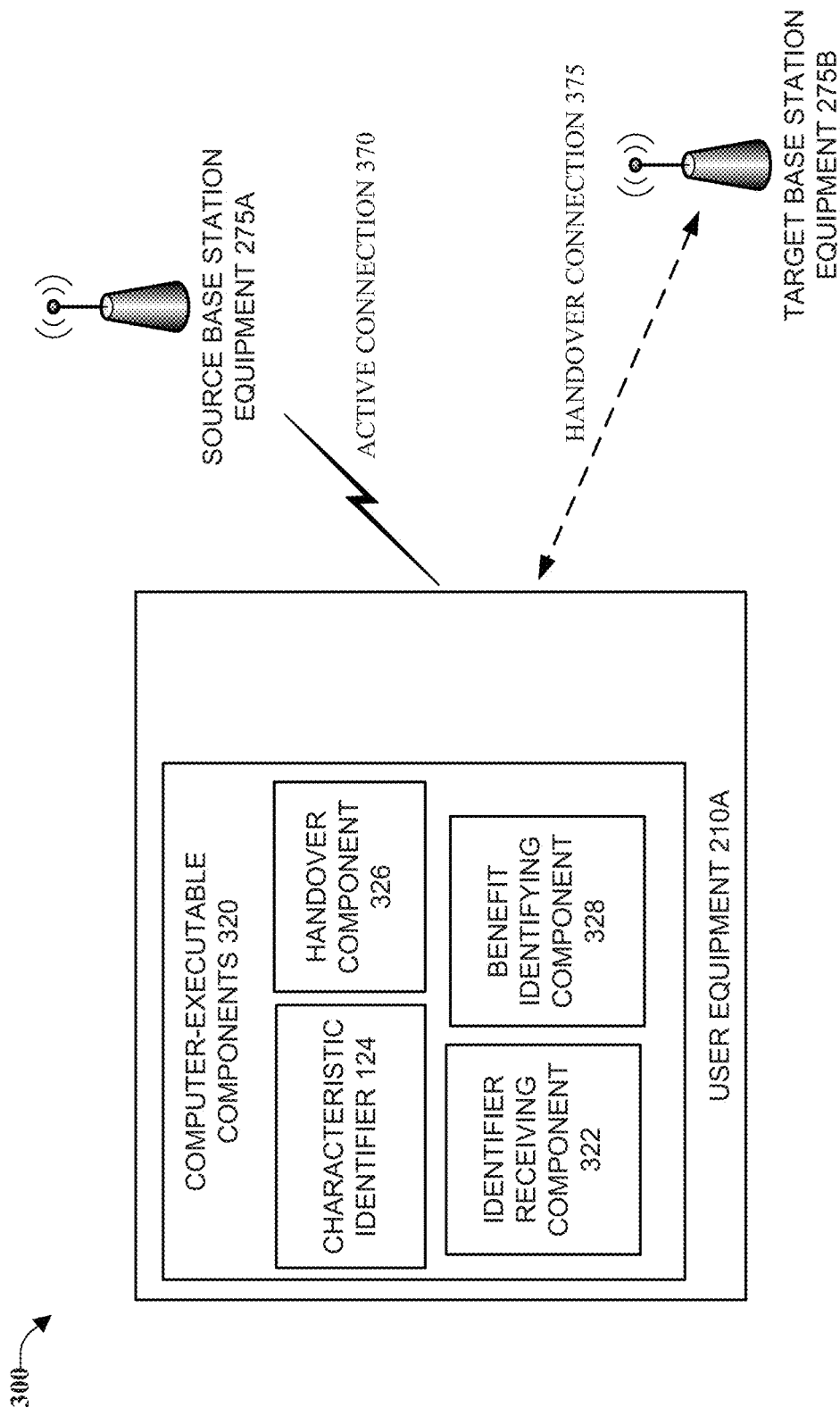
FIG. 3 depicts system having a user equipment actively connected to source base station equipment, in accordance with one or more embodiments.

FIG. 3 depicts system 300 having user equipment 210A actively connected to source base station equipment, in accordance with one or more embodiments. For purposes of brevity, description of like elements and/or processes employed in other embodiments is omitted.

System 300 includes user equipment 210A, source base station equipment 275A, target base station equipment 275B. User equipment 210A includes computer executable components 320, as well one or all of the components depicted in FIG. 9, for mobile handset 900. Computer executable components 320 can include identifier receiving component 322, handover component 326, benefit identifying component 328, and other components described or suggested by different embodiments described herein that can improve the operation of system 100. As discussed further below, in an alternative embodiment, benefit identifying component 328 can operate at source base station 275A (not shown).

Further, as depicted in FIG. 3, the connection between user equipment 210A and source base station equipment 275A is labeled as active connection 370, e.g., user equipment is connected to source base station equipment 275A and exchanging data over the connection. The active status of the user equipment 210A can be useful for implementation of different approaches to beneficially handover user equipment 210A to target base station equipment 275B. For example, by being in an active connection with source base station 275A, user equipment can collect information (e.g., by characteristic identifier 124) regarding performance characteristics of the connection, e.g., congestion, interference, throughput, and other measurements. These can provide a direct measurement mechanism for collecting information about both source and target base station equipment 275A-B.

As discussed further herein, because one or more embodiments can manage handovers among base stations, the processes can be termed load balancing. As discussed for some embodiments herein, because the load balancing is performed while user equipment is connected with an active connection some aspects described herein provide an approach to effect connected mode load balancing (CMLB), though this term is non-limiting to approaches described herein.

In one or more embodiments, computer executable components 320 can be used in connection with implementing one or more of the systems, devices, components, and/or computer-implemented operations shown and described in connection with FIG. 3 or other figures disclosed herein. For example, in one or more embodiments, computer executable components 320 can include instructions that, when executed by a processor (not shown), can facilitate performance of operations defining identifier receiving component 322. As discussed below, identifier receiving component 322 can, in accordance with one or more embodiments, receive, from network controller equipment, an indication to execute a handover from a first connection to first radio access network equipment to a second network connection to second radio access network equipment, with the indication being generated by the network controller equipment based on a congestion condition associated with the first radio access network equipment.

In an example, identifier receiving component 322 receives, from network controller equipment 150, an indication to execute a handover from active connection 370 coupled to a source base station equipment 275A to handover connection 375 coupled to target base station equipment 275B. In this example, the indication was generated based on a congestion condition of coverage area 280A. It should be noted that, as used herein, condition can be expressed as a performance characteristic, e.g., a measure of coverage area utilization or a base station utilization value. Each of these measurements express the extent of a problem that can be solved by one or more embodiments, e.g., load balancing between multiple available base station resources in a network Continuing this example with computer-executable components 320, in one or more embodiments, computer executable components 320 can include instructions that, when executed by a processor (not shown), can facilitate performance of operations defining handover component 326. As discussed below, handover component 326 can, based on the indication, execute the handover from the first radio access network equipment to the second radio-access network equipment.

In a variation of some embodiments discussed above, one or more embodiments can identify coverage area congestion, then relay this value to controller equipment 150. Facilitating this identification, in one or more embodiments, computer executable components 320 can include instructions that, when executed by a processor (not shown), can facilitate performance of operations defining characteristic identifier 124. For example, in one or more embodiments, characteristic identifier 124 can identify, based on a characteristic of the first network connection identified by user equipment 210A, the congestion condition. To facilitate use of this congestion condition by controller equipment 150, user equipment 210A can communicate the congestion condition to controller equipment 150. It should be noted that controller equipment can base an assessment of cell coverage utilization on a variety of different characteristics both described herein and suggested by the discussion of different network processes.

Another example performance characteristic that describes aspects of source base station equipment 275A is identified analysis by the user equipment. In one or more embodiments, user equipment 210A can identify different performance characteristics of the active connection, and also identify a predicted benefit from executing the handover to base station equipment 275B. One having skill in the relevant art(s), given the description herein, would appreciate that performance characteristics such as cell coverage 280A congestion can be combined with performance characteristics of coverage area 280B, and this combination can facilitate identifying a predicted benefit or detriment for executing the handover. In the alternative embodiment of benefit identifying component 328 discussed above, because this component is operating from source base station 275A, additional performance characteristics can be available to this component for benefit identification. For example, cell utilization, generally available to a base station and not a UE, can be a useful factor to use when estimating the gains from a handover from source base station 275A to target base station 275B. It should be noted that, as with other functions described herein, this function is not limited to a single location, rather, this function can also be performed by combinations of component in different locations, e.g., by a benefit identifying component 328 operating at both UE 210 and source base station 275A to combine the information available at both locations into various identified benefits.

Figure 4:
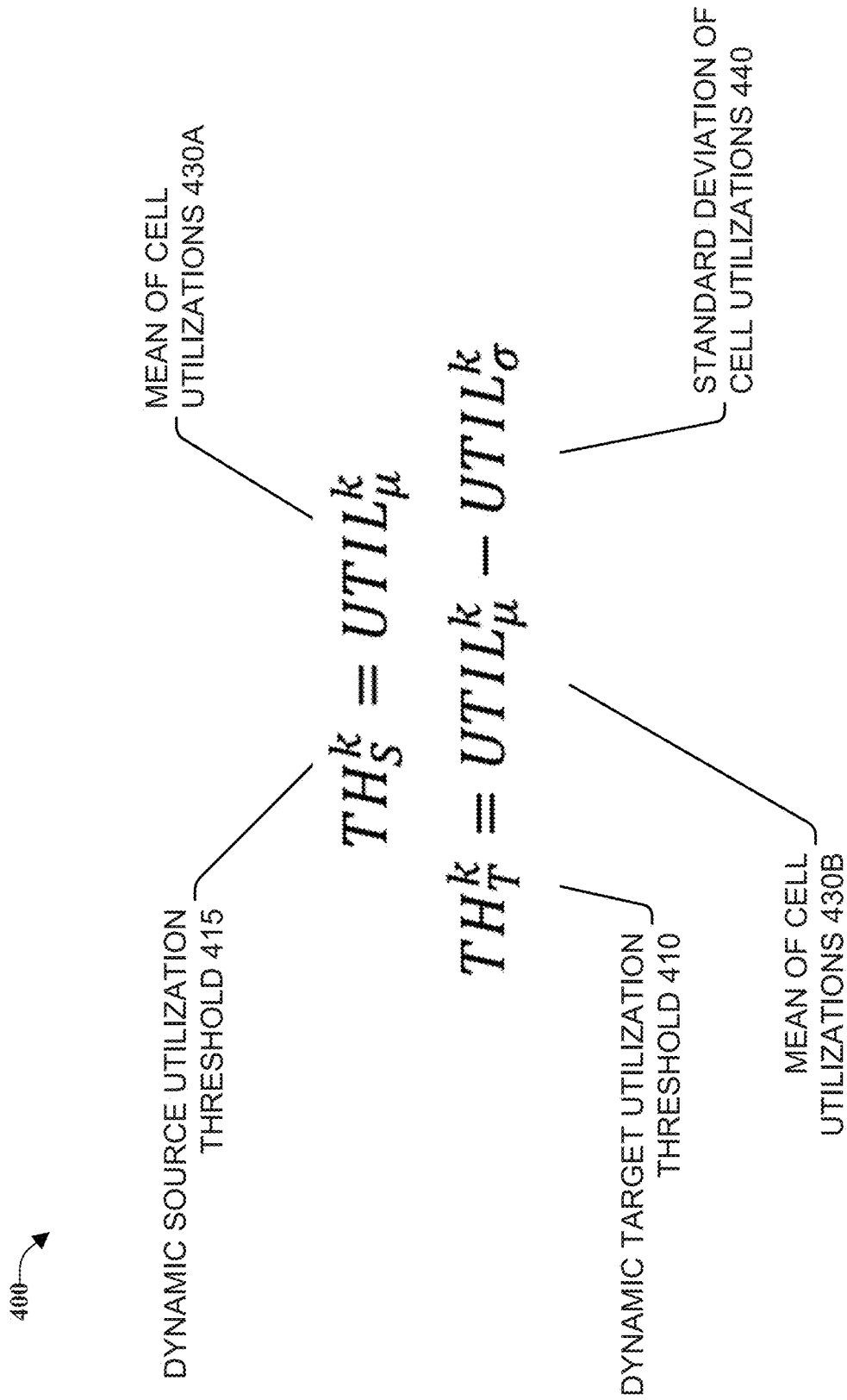
FIG. 4 depicts an example set of equations for dynamically modifying different thresholds that can control the handover processes described herein, in accordance with one or more embodiments.

FIG. 4 depicts an example set of equations 400 for dynamically modifying different thresholds that can control the handover processes described herein, in accordance with one or more embodiments. For purposes of brevity, description of like elements and/or processes employed in other embodiments is omitted.

As depicted, one or more embodiments can utilize two different dynamically modified thresholds: dynamic source utilization threshold 415 and dynamic target utilization threshold 410. As described above, the former threshold can be used to adjust when a handover is triggered based on utilization of the source coverage area 280A and the latter threshold can be used to adjust when a handover is accepted by target base station equipment 275B. An example characteristic for threshold discussed herein is the source threshold should be larger than the target threshold because traffic is handed over from a high loaded cell to a low loaded cell.

It should be noted that incorrect cell threshold settings degrade can degrade the efficacy of handovers for reducing congestions. For example, for a source cell, if a threshold is set too high, congestion could cause problems because fewer handovers will be initiated at given utilization rates. Conversely, if the source threshold is set too low, the more handovers will be initiated at a given utilization level, thereby risking interruptions in service from excessive handover events. With an inverse of the source examples noted above, similar problems can be caused with incorrect threshold settings of target cells, e.g., a high threshold can cause more handovers and a low setting can cause fewer handovers to be accepted. It should be noted, as well, that not all cells in the network will have a similar cell utilization, and even for the same cell, the cell utilization can vary over the time.

As described herein, to improve the likelihood of useful thresholds being applied over time, one or more embodiments can use controller functions to dynamically select thresholds based on different criteria. An example approach that can be used to set source threshold 415 can assess the utilization of other base stations in the area, with a handover being more likely based on the source base station having a utilization greater than a mean of cell utilizations 430A. It should be noted that this example is non-limiting, and one having skill in the relevant art(s), given the description herein would appreciate that other approaches can be used to beneficially adjust the threshold for handover from a source base station.

An approach that can be used to select target threshold 410 can utilize the standard deviation of cell utilizations 440 subtracted from mean of cell utilizations 430B. With this approach, it can be guaranteed that the source threshold is larger than the target threshold and the traffic is able be to offloaded from a high loaded cell to a low loaded cell. It should be further noted that this example is non-limiting, and one having skill in the relevant art(s), given the description herein would appreciate that other approaches can be used to beneficially adjust the threshold for accepting a handover from a source base station.

In another variation that can be incorporated into one or more embodiments, instead of applying the above equations to a broad group of base stations (e.g., using the mean utilization and a standard deviation of the utilization values, the set of analyzed base stations can be classified before the analysis above based on the utilization load of the base stations, e.g., low load, medium load, and high load. Thus, in this approach, the above described threshold determination approaches can be used for base stations with similar utilizations levels. In FIG. 4, for example, k=1 can indicate base stations having a low load, and k=2 can indicate that base stations have a medium load. It should be appreciated that these utilization classifications are not necessarily fixed, e.g., based on a cell load change, the classification can be updated.

In one or more embodiments, load classifications can be distributed along a normal distribution curve, e.g., where cells with outlier load levels will not have handover thresholds influenced by the medium level of utilization, and the majority of cells in the medium level of utilization will not have handover thresholds influenced by the outliers. It should be appreciated that this classification approach is not intended to be limiting, and one having skill in the relevant art(s), given the description herein would understand that other approaches could be used, e.g., more than three levels and different adjustments for high and low outliers could be selected, based on circumstances. It should also be understood that, because the above approaches are based on relative utilization measures, these approaches can be applied to groups including both LTE and NR radio-access technology cells, e.g., the differences in radio-access technologies do not affect threshold determination approaches, in one or more embodiments.

Based on features described with one or more embodiments, above, the following example implementation described different steps in a handover process. Features of this example can potentially improve handover performance, e.g., by improving the cell load balancing among cells and increasing the average UE throughput in the network with the minimal handovers. Initially, different handover conditions can be assessed by one or both the source user equipment, different target user equipment, and controller component 150. An example handover condition can include values for channel conditions of the source base station and target base stations, including, but not limited to, reference signal received power (RSRP), reference signal received quality (RSRQ), and signal to interference plus noise ratio (SINR).

As described above, updated thresholds can be determined, and utilization values can be measured for the source base station and potential target base stations. In some implementations, when both the source base station utilization is greater than the source utilization threshold and the potential target base station is less than the target base station threshold, then a target UE can be added to a set of handover target candidates.

In a variation, as noted above, in different embodiments, base stations and UEs can determine potential benefits from a handover, e.g., in terms of a potential UE throughput gain from executing the handover from the serving cell to the target cell, or, in terms of the cell utilization change by executing handover from the serving cell to the target cell. One approach to including these determined benefits into the handover analysis discussed above can generate a handover weight that adjust the handover analysis, with these weights being periodically relayed to controller component 150 for use in the handover analysis.

Next, in one or more embodiments, controller component 150 can rank all handover candidate UEs (e.g., selected based the thresholds discussed above) based on their weights in a descending order, and select a subset of UEs from high weight to low weight, subject to any handover resource limitations applied, e.g., a maximum number of handovers allowed per cell over a period of time. Once handover targets are selected, instructions can be relayed to selected target UEs for additional analysis and actions.

Figure 5:
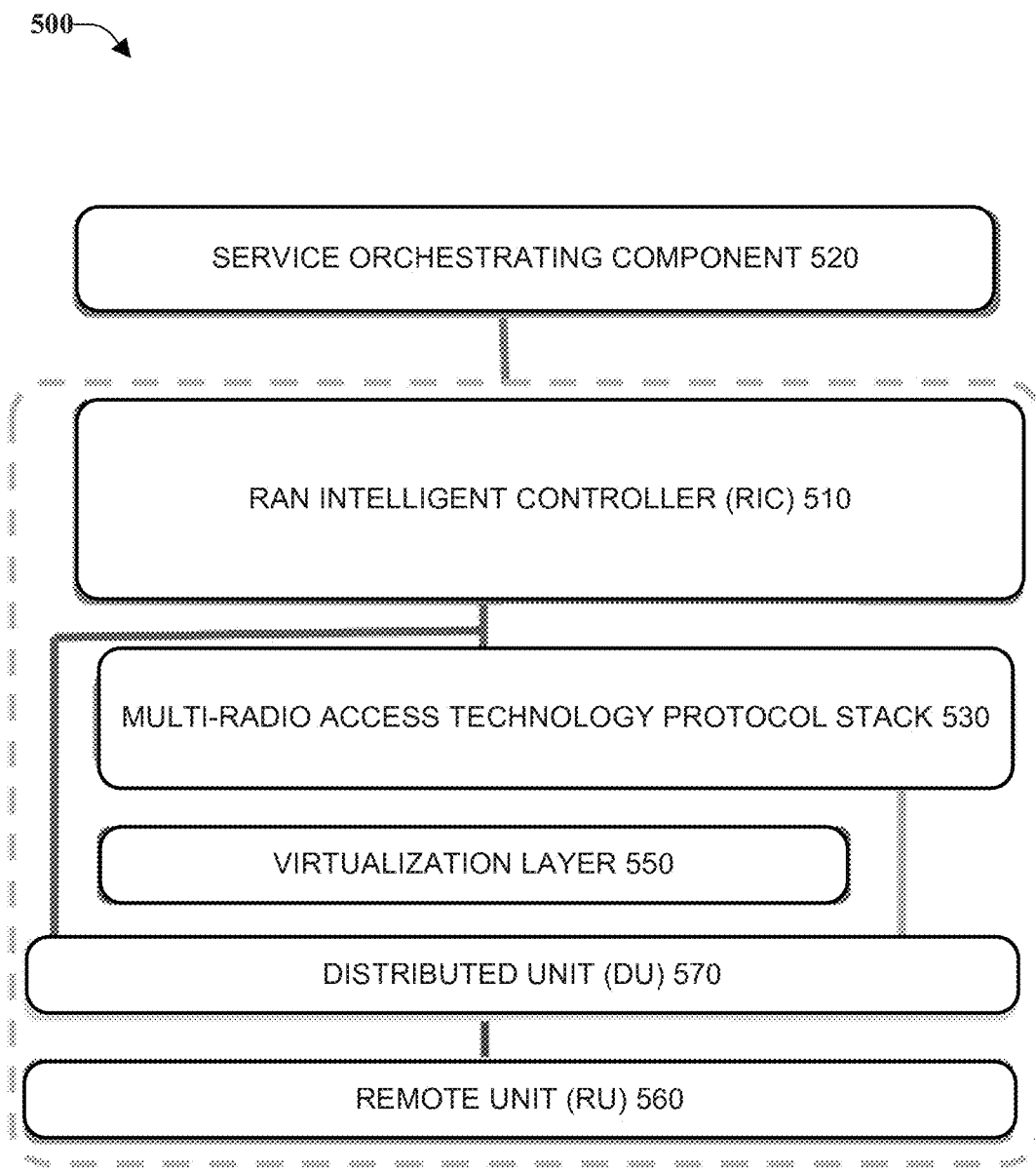
FIG. 5 depicts a system where one or more functions of the controller component described above can be implemented, in accordance with one or more embodiments described above.

FIG. 5 depicts a system 500 where one or more functions of controller 150 described above can be implemented, in accordance with one or more embodiments described above. For purposes of brevity, description of like elements and/or processes employed in other embodiments is omitted. In one or more embodiments, controller component 150 can be implemented in a software platform that includes several interconnected components. As depicted, system 500 includes, RAN intelligent controller (RIC) 510, multi-radio access tech. protocol stack 530, virtualization layer 550, remote unit (RU) 560, and distributed unit (DU) 570.

In an example, RIC 510 can include the functions of controller component 150, supported by the other layers of system 500. For example, different components facilitating different RATs can controlled using multi-radio access tech. protocol stack 530 and different virtualized components can be implemented with virtualization layer 550. In addition, as depicted, different elements of open RAN architectures can be served by different functions provided by controller component 150, e.g., DU 570 and RU 560.

Figure 6:
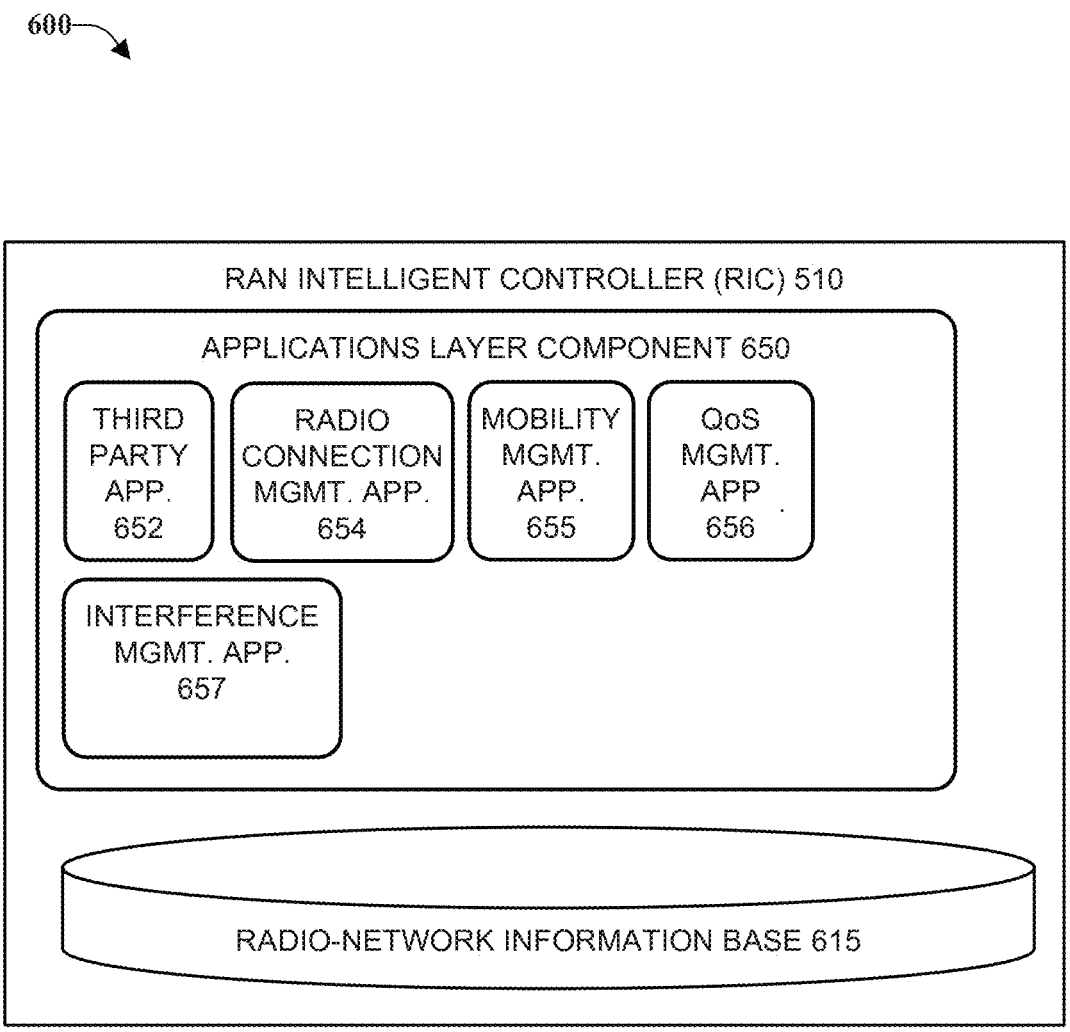
FIG. 6 depicts a system that includes a detailed view of the RIC discussed above, in accordance with one or more embodiments.

FIG. 6 depicts a system 600 that includes a detailed view of RIC 510 discussed above, in accordance with one or more embodiments. For purposes of brevity, description of like elements and/or processes employed in other embodiments is omitted.

Further to the discussion RIC 510 in FIG. 5, system 600 can applications layer component 650 and radio-network information base 615. Applications layer component 650 can include third party applications 652, radio connection management application 654, mobility management application 655, QoS management application 656, and interference management application 657, in accordance with one or more embodiments.

Figure 7:
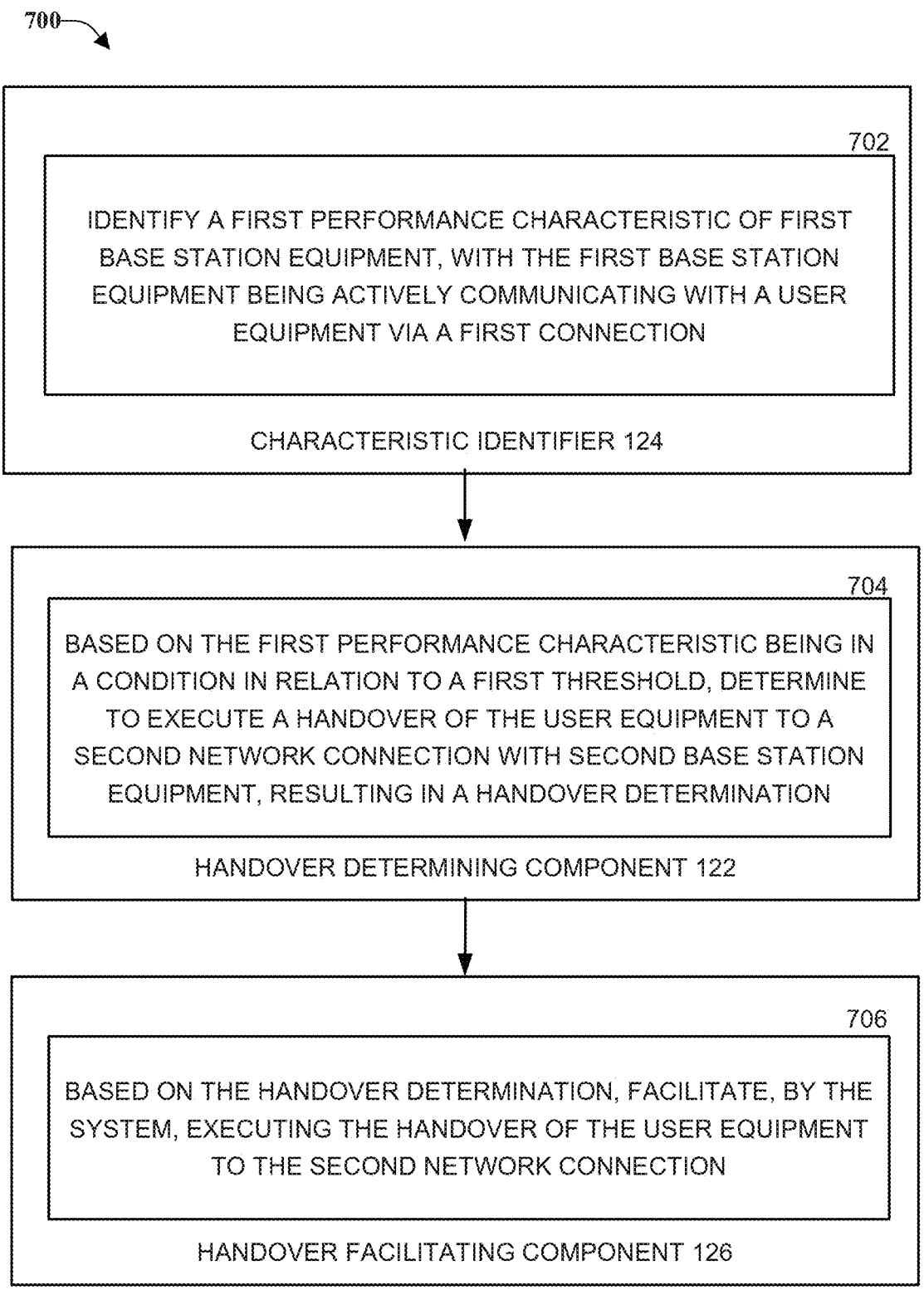
FIG. 7 illustrates an example system that can facilitate managing handover events in a radio access network based on dynamically adjusted thresholds, in accordance with one or more embodiments.

FIG. 7 illustrates an example system 700 that can facilitate managing handover events in a radio access network based on dynamically adjusted thresholds, in accordance with one or more embodiments. For purposes of brevity, description of like elements and/or processes employed in other embodiments is omitted.

As depicted, system 700 includes handover determining component 122, characteristic identifier 124, and handover facilitating component 126. In one or more embodiments, characteristic identifier 124 can be configured 702 to identify a first performance characteristic of first base station equipment, with the first base station equipment being actively communicating with a user equipment via a first network connection. In one or more embodiments, handover determining component 122 can be configured 704 to, based on the first performance characteristic being in a condition in relation to a first threshold, determine to execute a handover of the user equipment to a second network connection with second base station equipment, resulting in a handover determination. In one or more embodiments, handover facilitating component 126 can be configured 706 to facilitate, by the system, executing the handover of the user equipment to the second network connection.

Figure 8:
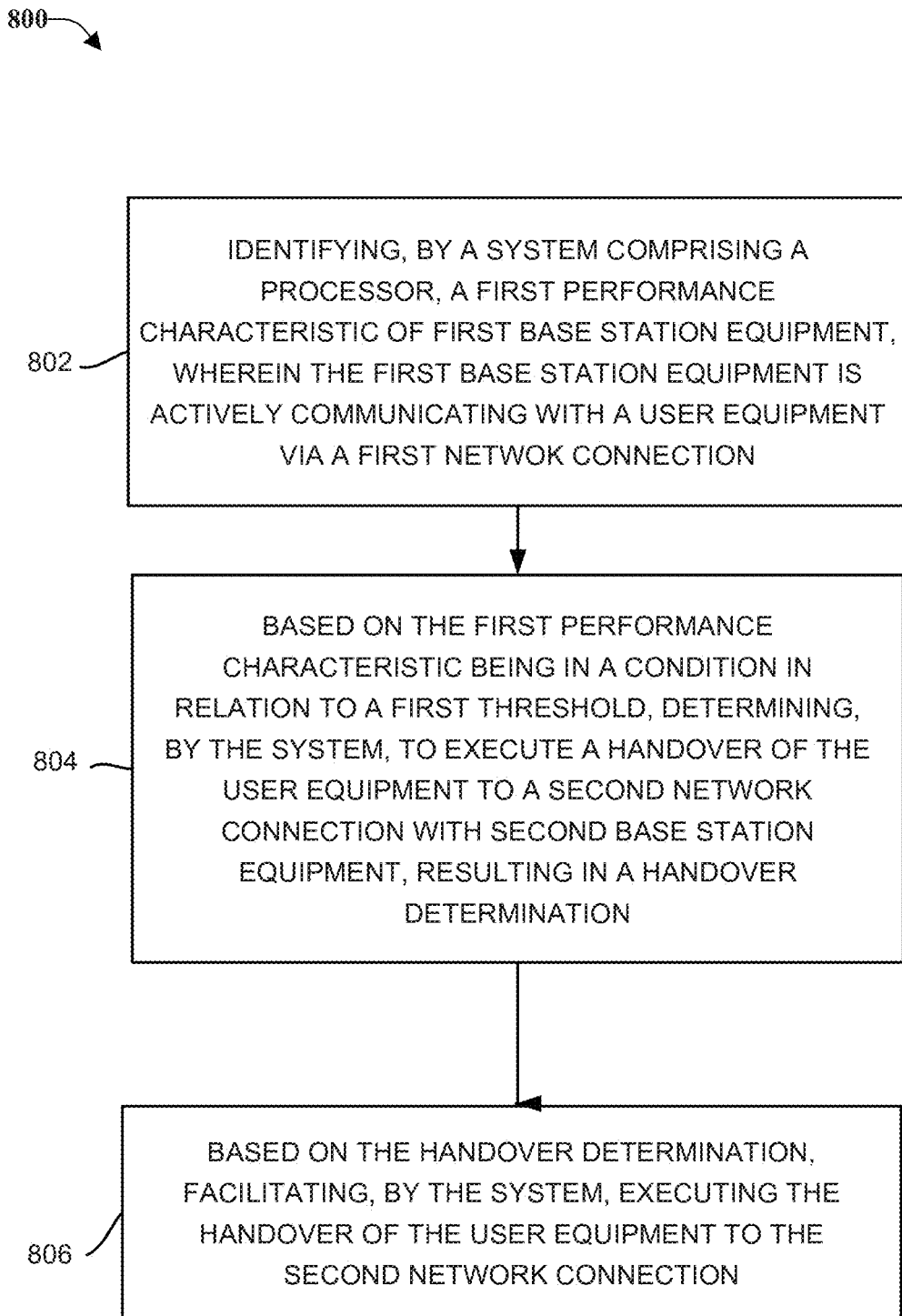
FIG. 8 illustrates an example method that can facilitate managing handover events in a radio access network based on dynamically adjusted thresholds, in accordance with one or more embodiments.

FIG. 8 illustrates an example method 800 that can facilitate managing handover events in a radio access network based on dynamically adjusted thresholds, in accordance with one or more embodiments. For purposes of brevity, description of like elements and/or processes employed in other embodiments is omitted.

At 802, method 800 can include, identifying a first performance characteristic of first base station equipment, with the first base station equipment being actively communicating with a user equipment via a first network connection. At 804, method 800 can further include, based on the first performance characteristic being in a condition in relation to a first threshold, determining to execute a handover of the user equipment to a second network connection with second base station equipment, resulting in a handover determination. At 806, method 800 can further include based on the handover determination, facilitating, by the system, executing the handover of the user equipment to the second network connection.

Figure 9:
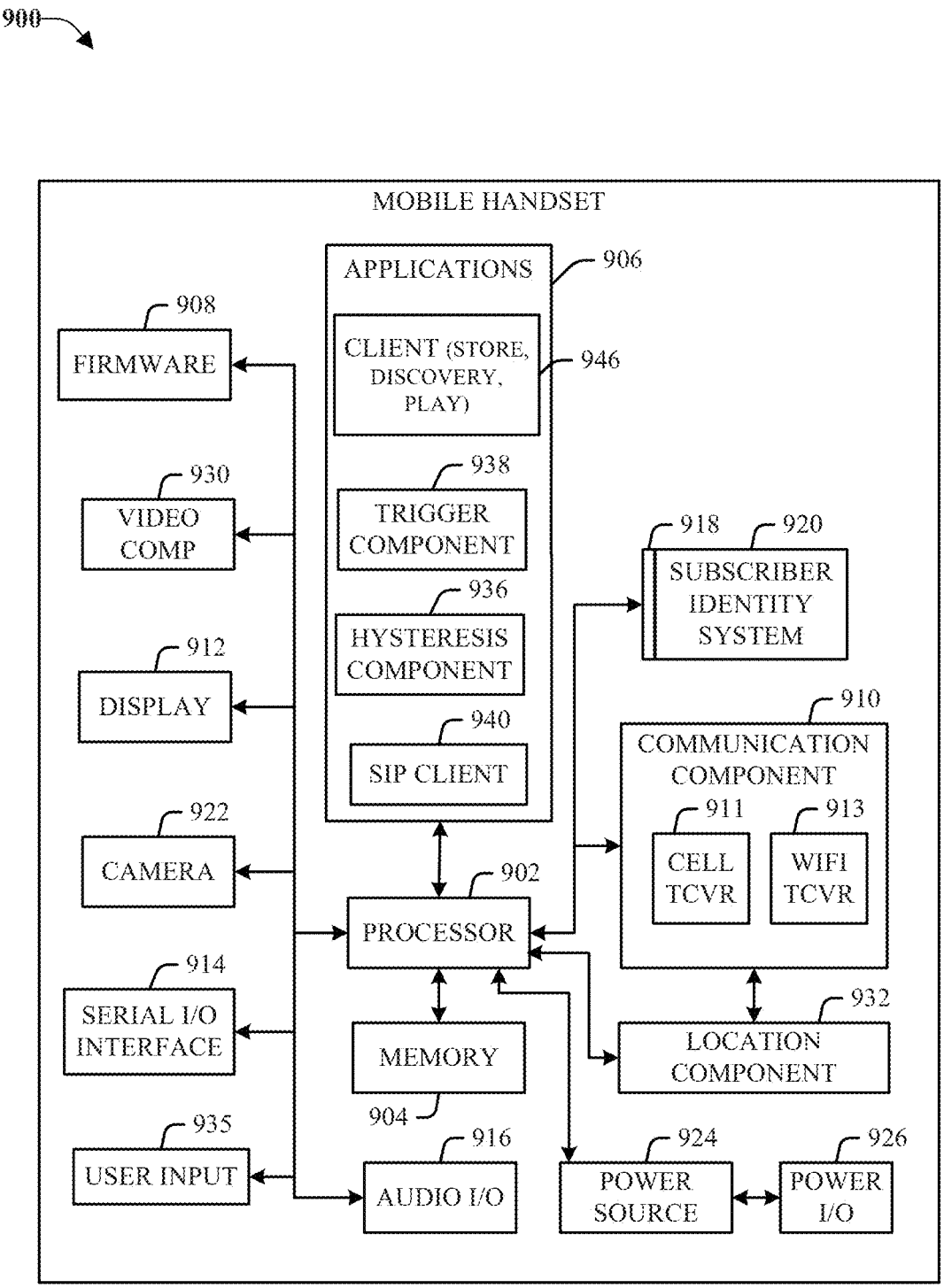
FIG. 9 illustrates an example block diagram of an example mobile handset operable to engage in a system architecture that can facilitate processes described herein, in accordance with one or more embodiments.

FIG. 9 illustrates an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Network 190 can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where user equipment operate using multiple carriers, e.g., LTE FDD/TDD, GSM/GERAN, CDMA2000, etc. For example, wireless communication system 200 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

Various embodiments described herein can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
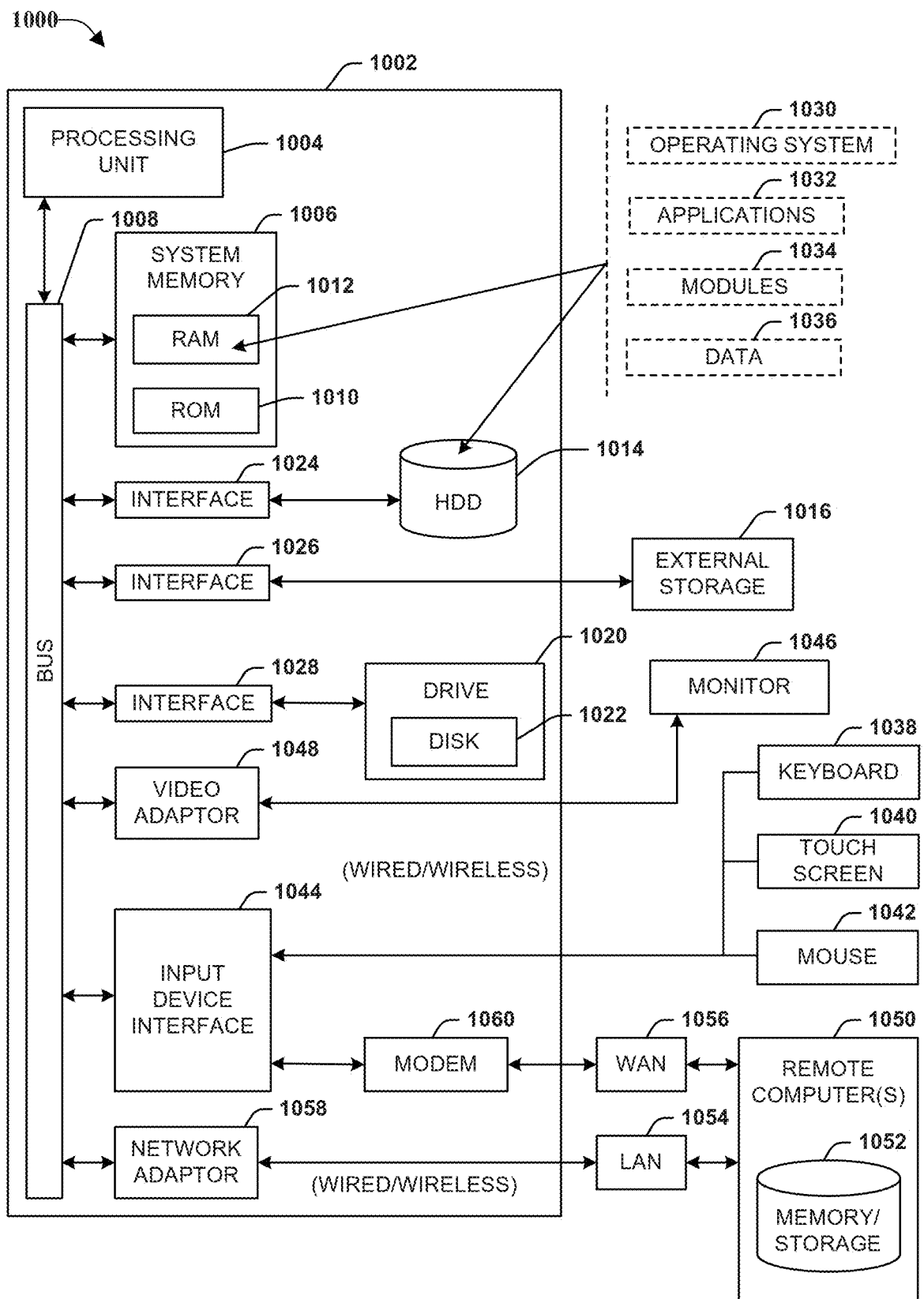
FIG. 10 illustrates an example block diagram of an example computer operable to engage in a system architecture that can facilitate processes described herein, in accordance with one or more embodiments.

FIG. 10 provides additional context for various embodiments described herein, intended to provide a brief, general description of a suitable operating environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example operating environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

Further to the description above, as it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipment do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g., call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the embodiments are not to be limited to any single implementation, but rather are to be construed in breadth, spirit and scope in accordance with the appended claims.

The invention claimed is:

1. A method, comprising:
   determining, by first base station equipment comprising a processing system including a processor, a source base station utilization value applicable to the first base station equipment, wherein the first base station equipment is actively communicating with a user equipment via a first network connection;
   dynamically determining a source congestion threshold according to the source base station utilization value to obtain a dynamically determined source threshold;
   dynamically determining a target congestion threshold to obtain a dynamically determined target threshold;
   identifying, by the first base station equipment and according to a relationship between the dynamically determined source and target thresholds, a predicted benefit to the user equipment of a handover to a second network connection with second base station equipment; and
   based on the predicted benefit being determined to satisfy a function in relation to the relationship between the dynamically determined source and target thresholds, receiving, by the first base station equipment, an indication to handover communication with the user equipment from the first network connection to the second network connection with the second base station equipment.

2. The method of claim 1, wherein the predicted benefit comprises a change in throughput for communication by the user equipment, and wherein the handover comprises a non-mobility handover.

3. The method of claim 1, further comprising, based on environment information, selecting, by the first base station equipment, the target congestion threshold, wherein the handover comprises a non-mobility handover.

4. The method of claim 3, wherein the source congestion threshold comprises a mean utilization value, wherein the target congestion threshold comprises applying an offset to the mean utilization value, and wherein the indication was received from network equipment that determined the predicted benefit based on the environment information.

5. The method of claim 3, wherein the environment information comprises comparison data representative of a comparison of current conditions associated with communicating with the user equipment with a prediction of future conditions implicating satisfaction of the function in relation to the target congestion threshold.

6. The method of claim 3, wherein the environment information comprises aggregated performance characteristics for other user equipment, other than the user equipment, connected to the first base station equipment.

7. The method of claim 6, wherein determining the aggregated performance characteristics comprises determining a mean of performance characteristics.

8. The method of claim 1, wherein the predicted benefit being determined to satisfy the function in relation to the target congestion threshold comprises the predicted benefit being determined to exceed the target congestion threshold.

9. The method of claim 1, wherein the predicted benefit comprises the source base station utilization value and the dynamically determined target threshold comprises a source utilization threshold.

10. The method of claim 1, wherein the handover comprises a non-mobility handover.

11. The method of claim 1, wherein the handover comprises communicating, to the user equipment, handover information comprising the indication to handover the communication.

12. The method of claim 1, wherein communicating with the user equipment via the first network connection comprises communicating with the user equipment using at least a fifth-generation network protocol.

13. A first network device, comprising:
   a processing system including a processor; and
   a memory that stores executable instructions that, when executed by the processing system, facilitate performance of operations, comprising:
      determining a source base station utilization value applicable to a first network device, wherein the first network device is actively communicating with a user equipment via a first network connection;
      dynamically determining a source congestion threshold according to a source network device utilization value applicable to the first network device to obtain a dynamically determined source threshold;
      dynamically determining a target congestion threshold to obtain a dynamically determined target threshold;
      receiving, from a second network device and according to the target congestion threshold, a value representative of a predicted benefit to the user equipment, from performance of a handover to a second network connection via a third network device; and
      based on the value representative of the predicted benefit being determined to satisfy a function in relation to a relationship between the dynamically determined source and target thresholds, determining to perform the handover to communicating with the user equipment using the second network connection.

14. The first network device of claim 13, wherein the value representative of the predicted benefit comprises a change in throughput for communication by the user equipment.

15. The first network device of claim 13, wherein the first network device and the third network device respectively comprise a first access point device and a second access point device.

16. The first network device of claim 13, wherein the second network device comprises a core network device.

17. The first network device of claim 13, wherein the value representative of the predicted benefit was determined by the second network device based on a first performance characteristic of the first network connection.

18. A non-transitory machine-readable medium, comprising executable instructions that, when executed by a processing system including a processor of first access point equipment, facilitate performance of operations, comprising:
   determining a source base station utilization value applicable to first base station equipment corresponding to a first network connection with a user equipment, wherein the first base station equipment is actively communicating with the user equipment via the first network connection;

dynamically determining a source congestion threshold according to the source base station utilization value to obtain a dynamically determined source threshold;

dynamically determining a target congestion threshold to obtain a dynamically determined target congestion threshold;

identifying, according to a relationship between the dynamically determined source and target thresholds, a predicted benefit to the user equipment of a handover to a second network connection with second base station equipment; and based on the predicted benefit being determined to satisfy a function in relation to the relationship between the dynamically determined source and target thresholds, transferring communication with the user equipment from the first network connection to the second network connection.

19. The non-transitory machine-readable medium of claim 18, wherein communication via the first network connection comprises communication via a new radio network that communicates according to a new radio network protocol.

20. The non-transitory machine-readable medium of claim 18, wherein the transferring comprises performing a non-mobility handover.

* * * * *